United States Patent
Deitz et al.

[11] 4,085,319
[45] Apr. 18, 1978

[54] SPATIAL-MULTIPLEX, SPATIAL-DIVERSITY OPTICAL COMMUNICATION SCHEME

[75] Inventors: Paul H. Deitz; Gary L. Durfee, both of Bel Air; Stephen S. Wolff, Baltimore, all of Md.

[73] Assignee: The United States of America as represented by the Secretary of the Army, Washington, D.C.

[21] Appl. No.: 764,622

[22] Filed: Feb. 1, 1977

[51] Int. Cl.² .................................................. H04B 9/00
[52] U.S. Cl. ........................................................ 250/199
[58] Field of Search ......................................... 250/199

[56] References Cited
U.S. PATENT DOCUMENTS

| | | | |
|---|---|---|---|
| 3,755,676 | 8/1973 | Kinsel | 250/199 |
| 3,987,428 | 10/1976 | Todeschini | 250/199 |

*Primary Examiner*—Howard W. Britton
*Attorney, Agent, or Firm*—Nathan Edelberg; Harold H. Card, Jr.; A. Victor Erkkila

[57] ABSTRACT

An optical communications system for coding, transmitting, receiving, and decoding digital message signals is described. A beam from a coherent optical source, such as a laser, is transmitted through an aperture in which there is disposed a random phase screen, e.g., ground glass. One or more isometric bar gratings containing the coded message data in a particular amplitude distribution pattern are disposed adjacent to the ground glass in the optical transmission path. The ground glass, phase screen, introduces a random coding to the message bit. At the receiver a plurality of point detectors sense the signals to facilitate subsequent decoding of the message.

10 Claims, 15 Drawing Figures

GRATINS GA IN TRANSMITTER APERTURE

*FIG. 3A*

GRATING GB IN TRANSMITTER APERTURE

*FIG. 3B*

FIG. 4
SIGNAL PROCESSING BY SPATIAL AVERAGING

FIG. 5
SIGNAL PROCESSING BY TEMPORAL AVERAGING

FIG. 6
SIGNAL PROCESSING BY COMBINED TEMPORAL-SPATIAL AVERAGING

CORRELATION FUNCTION OF VERTICAL SCAN

FIG. 7A

CORRELATION FUNCTION OF 45° SCAN

FIG. 7B

CORRELATION FUNCTION OF HORIZONTAL SCAN

MULTIPLE-BIT ENCODING. THREE SIGNALS DERIVED FROM THREE LINEAR SCANS THROUGH THE SAME SPECKLE PATTERN

FIG. 7C

UNDISTORTED IMAGE (UPPER SCAN) WITH CORRESPONDING POWER SPECTRUM

*FIG. 8A*

DISTORTED IMAGE (UPPER SCAN) DUE TO SPATIAL NOISE IN OPTICAL PATH WITH RESULTING IMAGE POWER SPECTRUM

*FIG. 8B*

EFFECT OF RANDOM PHASE IN OPTICAL PATH ON SPECKLE SIGNAL PROCESSING

FIG. 9

EFFECTS OF RANDOM SPATIAL NOISE ON DUAL-CHANNEL BINARY COMMUNICATION LINK

FIG. 10

SPATIAL-MULTIPLEX, SPATIAL-DIVERSITY OPTICAL COMMUNICATION SCHEME

The invention described herein may be manufactured, used, and licensed by or for the United States Government for governmental purposes without the payment to us of any royalty thereon.

BACKGROUND OF THE INVENTION

1. Field of Invention

The present invention relates to an optical line-of-sight communication apparatus for coding, transmitting, receiving and decoding digital message bits.

2. Description of Prior Art

Heretofore, in nearly all prior art systems, message coding in line-of-sight optical communications systems was effected by temporally modulating the total intensity of the transmitted beam. There are two principle disadvantages to this process: (1) The turbulent atmosphere in the propagation path also modulates the beam in space and time, causing errors in the detection process and (2) the presence of aerosols along the optical path causes some of the optical energy to be scattered out of the beam. This off-axis scatter can be observed at wide angles to the initial direction of beam propagation and by monitoring the irradiance fluctuations, the message being transmitted can be decoded. Thus, the message can be intercepted by unauthorized parties to whom the message was not directed.

SUMMARY OF THE INVENTION

Accordingly, it is an object of the present invention to provide an optical communications system for transmitting digital message data which is not significantly affected by turbulent atmospheric conditions in the beam path.

It is a further object of the present invention to provide an optical communication system for transmitting digitally coded messages along well defined beam paths, which can not be decoded from scattered radiation at wide angles of divergence from the selected beam path.

The objects of the present invention are fulfilled by providing an optical communication system wherein the information being transmitted is coded in the cross sectional (spatial) character of the optical beam and not in accordance with the total energy being transmitted. To detect and decode the message the beam must be evaluated at many points within its cross sectional extent. Radiation scattered at wide angles from the beam does not retain the spatial character necessary for decoding, since this scattered radiation is essentially only related to the total energy transmitted. Accordingly, this spatial coding of the present invention precludes the interception of coded messages at wide angles to the beam path.

In addition, because the detection takes place without the use of foreoptics, the method of the present invention is relatively insensitive to the degrading effects of atmospheric turbulence in comparison to standard image-forming methods of the prior art.

The optical communications apparatus of the present invention includes a coherent source of light (laser) as a carrier for transmitting a message along a beam path, a coded message bit in the form of an isometric bar grating of a selected spatial frequency and orientation, a random phase screen including a section of ground glass in close proximity to the bar grating within a beam aperture for introducing a random coding to the message bit, and a plurality of point detectors for detecting the spatial information transmitted.

If desired, additional isometric bar gratings of different spatial frequency and the same or different orientations may be inserted in the system for coding additional bits.

BRIEF DESCRIPTION OF DRAWINGS

The objects of the present invention and the attendant advantages thereof will become more readily understood by reference to the following drawings wherein.

DETAILED DESCRIPTION OF PREFERRED EMBODIMENTS

Figures 1, 1A:
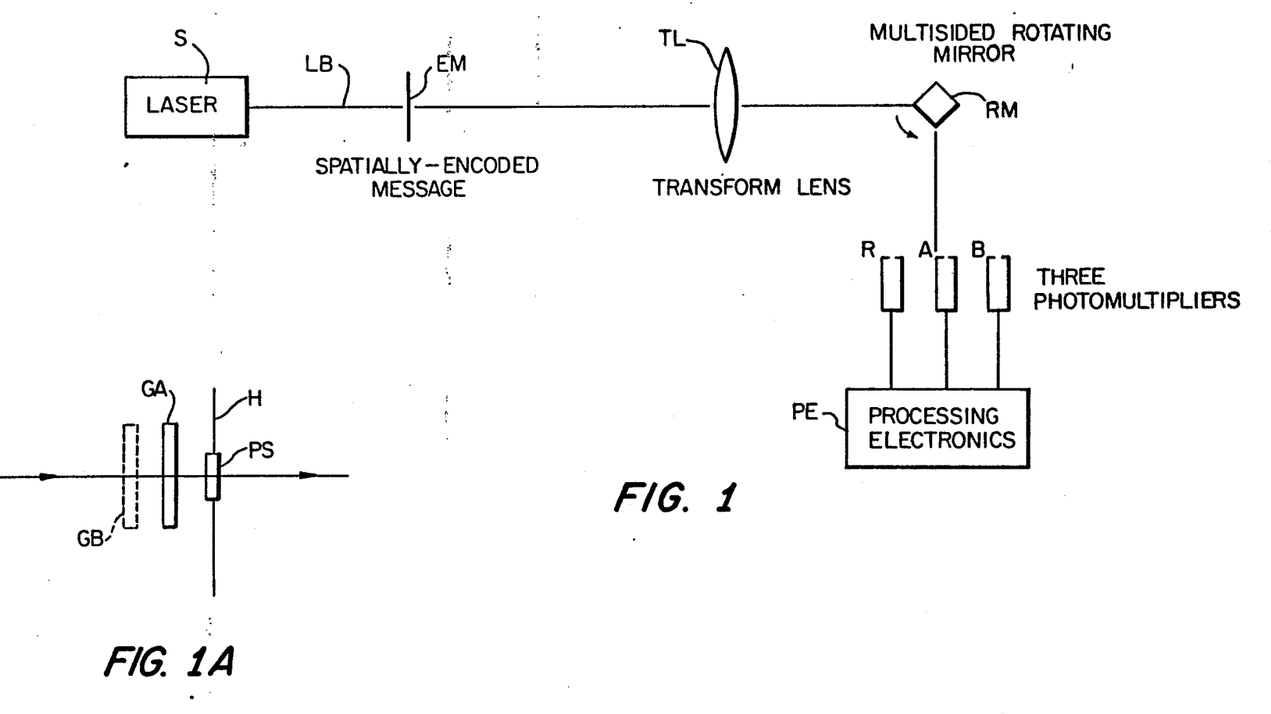
FIG. 1 is a schematic diagram of the optical system of one embodiment of the present invention.
FIG. 1A is an enlarged view of the spatially encoded message plane of FIG. 1.

Referring in detail in FIG. 1 there is illustrated a schematic diagram of the basic communications system of the present invention. A light source S is provided which in the preferred embodiment of the present invention is any suitable form of laser. A coherent light source is necessary in the system of the present invention since the theory of operation is based on the ability to generate laser speckle patterns in the optical far field.

A light beam LB generated by the laser S is directed through the plane labeled EM which contains the spatially encoded message to be transmitted. In a preferred embodiment this coded message is obtained by the combination of a random phase screen PS and one or more isometric bar gratings GA, GB. See FIG. 1A. The isometric bar gratings are of selected different spatial frequencies and of the same orientation. The random phase screen in a preferred embodiment is a section of ground glass contained in a beam defining aperture. As will become more fully apparent hereinafter the ground glass introduces a random coding to the message by spatially phase modulating the beam.

The ground glass section is disposed in aperture plate H to facilitate rotation in the plane thereof by a motor (not shown) for reasons to become apparent hereinafter.

The Transform lens TL in FIG. 1 is utilized only in a laboratory setup to simulate the conditions achieved by far field optics. In a full-scale setup the lens TL is not present. The use of a lens affords a geometrical compactness for a laboratory setup.

The beam transmitted from the message plane EM containing a spatially encoded message is reflected by a multi-sided rotating mirror RM into a plurality of point detectors R, A, and B, such as photomultiplers. When rotating the mirror RM causes the encoded laser beam to be swept across the detectors R, A, and B giving effectively a one dimensional spatial scan through the cross section of the laser beam. This scan is made perpendicular to the orientation of the bars of the isometric bar gratings G1, G2. The apertures of detectors R, A, and B are about one-fifth the diameter of the average speckle size present in the far field to prevent aperture averaging.

Figure 2:
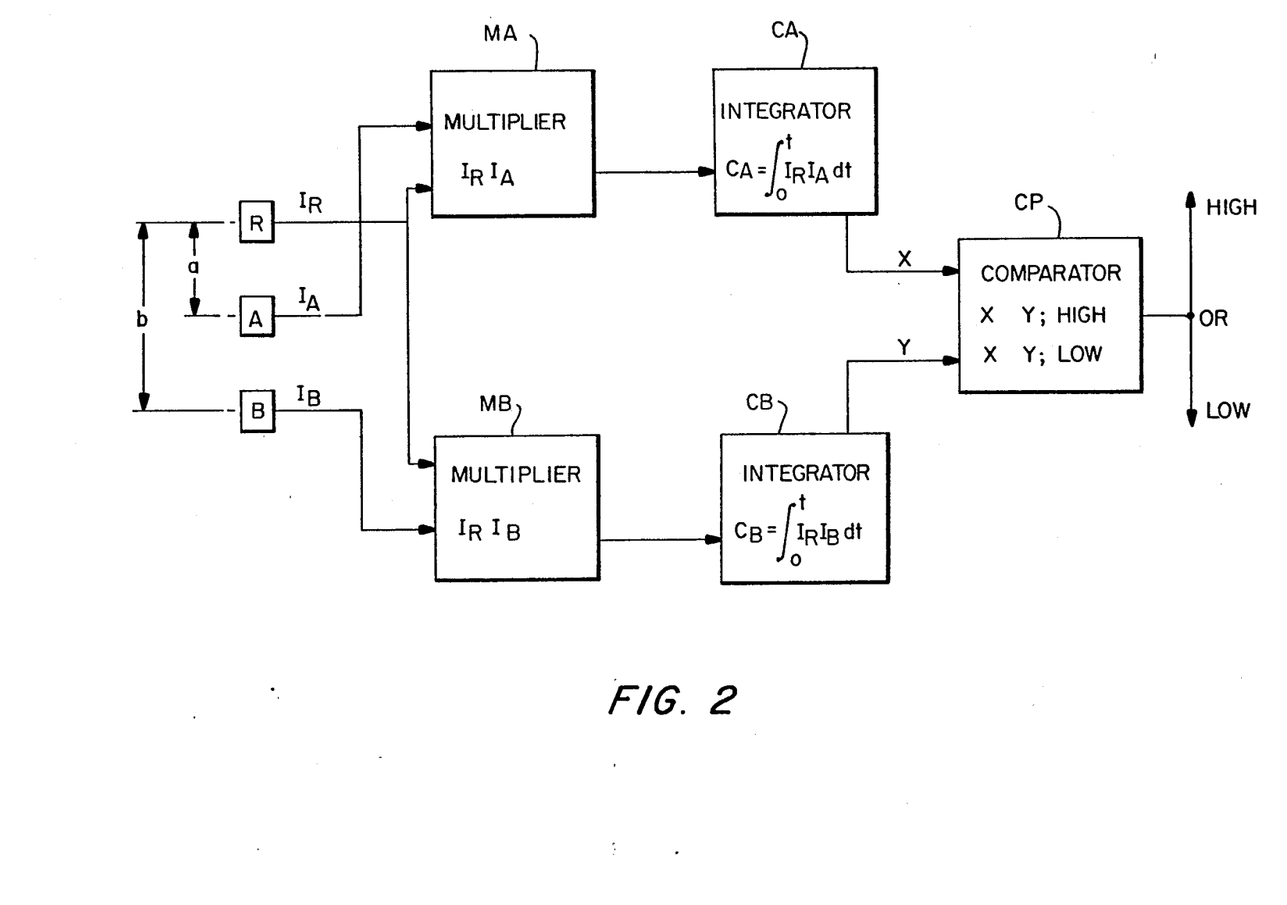
FIG. 2 is a schematic diagram of the processing electronics portion of the system of FIG. 1.

For a particular isometric bar grating, specific spatial frequency information is present in the far field speckle pattern detected by the three detectors. This information in the far field speckle pattern is mathematically related to the transform of the intensity at the isometric bar grating. When the speckle pattern is detected by the photomultiplier (PM) tubes (a squaring process) and electronically cross-correlated $$(C = \int_0^t I_R I_A dt,$$

where $I_R$=output of PM tube R, $I_A$=output of PM tube A and $t$=some predetermined time interval) the resulting correlation function, C, is related to the power spectrum of the intensity on the original isometric bar grating (see FIG. 2). This correlation function can be maximized for a specific bar grating by separating a pair of PM tubes by a distance corresponding to the far field spatial lag for the fundamental spatial frequency of the bar grating. If PM tubes R and A are separated properly for bar grating GA by a distance a and PM tubes R and B are separated properly for a second bar grating GB by a distance b, then a binary communication system has been established; while the speckle pattern is interrogated for spatial frequency components, only one or the other is present in this particular setup. Thus, if bar grating GA is present in the beam, then the cross correlation function produced from PM's R and A ($C_A$) will be a maximum while the cross correlation function produced from PM's and R and B ($C_B$) will be a minimum (noise level). Replacing bar grating GA with GB reverses the results, $C_B$ becoming greater than $C_A$.

There are three alternative ways by which speckle information may be made available to the PM tubes for detection and processing: by spatial scan, by temporal scan, and by a combination of spatial/temporal scans.

In the spatial scan mentioned above, the ground glass PS at the laser transmitter is fixed, and the rotating mirror RM causes the nonchanging laser speckle pattern to move across the PM tubes thus giving, in this instance, a one dimensional spatial scan across the speckle pattern.

In the temporal case, the ground glass PS (located close to the bar gratings GA, GB is rotated causing the speckle pattern itself to change with the time while the rotation mirror RM is held fixed. Thus, the three PM tubes detect at only three specific places in the laser beam, but are provided with a changing speckle pattern produced by rotating the ground glass. (Note, however, that the speckle pattern at 0 radians is reproduced periodically at $2\pi$ radian rotations.)

In the temporal/spatial combination the ground glass PS and the mirror RM are both rotated, providing greatly increased statistical sampling. The combined method has the advantage of making the maximum number of speckle statistics available for detection and processing and, hence, increasing the system signal-to-noise ratio. In addition, by scanning through the beam, spatial noise due, for example, to atmospheric turbulence (which remains essentially unchanged during the transmission of a message bit) tends to average out spatially.

Thus, in simple system illustrated in FIG. 1, one of two bar gratings GA or GB is placed in close proximity to a section of ground glass PS at the transmitter and illuminated by coherent light from laser S. If three photomultiplier tubes are used in conjunction with a rotating mirror configuration at the receiver, the net effect is to detect a speckle pattern at many different points.

The processing electronics PE of FIGS. 1 and 2 are comprised of a dual-channel correlator including multipliers MA, MB and integrators CA, CB which simultaneously computes a time averaged correlation of the photomultiplier outputs of R with A and R with B. If the mirror RM is rotated, this time record also corresponds to a space average over the receiver plane. At the end of the computation time, the correlation values are compared. Since the interdetector spacings, a and b, are so chosen to infer the fundamental spatial harmonics of bar gratings GA and GB, a significant difference in power at the output of the dual integrators implies the presence of a particular grating and thus a particular coded message.

As illustrated in FIG. 2 the output of the integrators CA, CB are fed into a comparator CP as input signals X and Y, respectively. The output of comparator CP then goes high or low depending on the relative values of X and Y. Thus, a digitally coded output is effected.

Figure 3A:
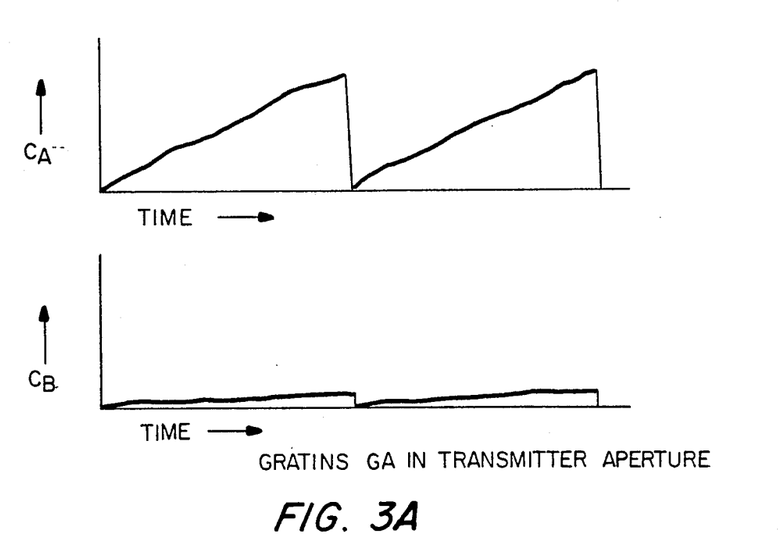
FIG. 3A is a sample signal at the output of the integrators of FIG. 2 with a first optical grating in the beam path.
Figure 3B:
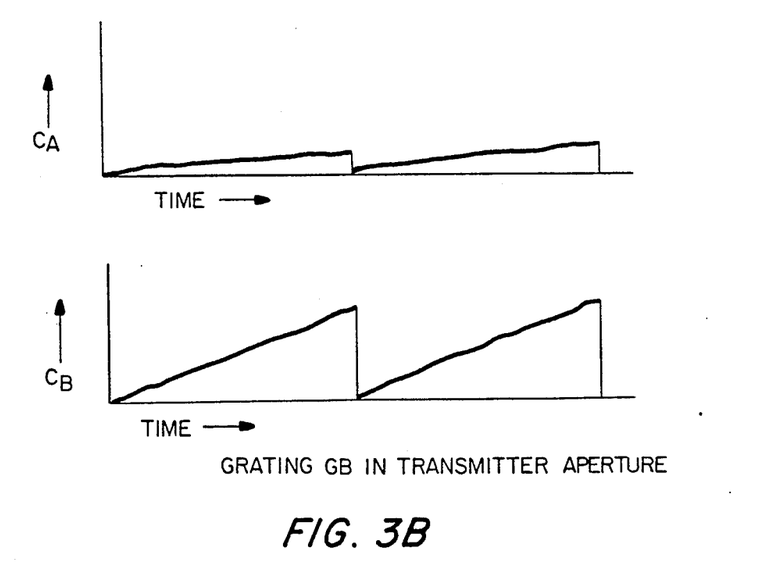
FIG. 3B is a sample signal at the output of the integrators of FIG. 2 with a second optical grating in the beam path.

FIG. 3 shows a sample of oscilloscope traces giving the results of the dual integrations of CA and CB. In FIG. 3A bar grating GA is in place showing a repetitive accumulation of power in integrator CA. It can be noted that integrator CB is fluctuating about some background noise level. In FIG. 3B, bar grating GB has been inserted at the transmitter. Here, the trace of integrator CA reverts to background level and integrator CB exhibits large deflections at the completion of the timing cycle. Subsequent circuitry such as CP of FIG. 2 compares the deflection in the two channels and signals the larger of the two.

From the above description, it should be obvious that the device description shows only a few of many ways in which the basic principle of this technique can be exploited. There are two central ideas in this communication process. First, the process is a spatial multiplex one, since the spatial frequency bit (isometric bar grating, etc.) is put in close proximity to a rough random phase screen (ground glass) and then illuminated by coherent light. The effect of the random phase modulation is to destroy what might otherwise be a recognizable far-field diffraction pattern of the object field distribution. Hence, the information at the transmitter is being spatially modulated by the random phase screen. Second, the process involves spatial diversity detection. For the method to work, the far field irradiance distribution must be detected at paired points in order to compute a correlation function. But in addition, the process is statistical and involves making averages. If the transmitter is arranged to send a time invariant signal (the ground glass is held static), the only means for obtaining an average is by a traversal across the receiver plane. This could be effected by using a multipoint sensor such as a charge-coupled device. As mentioned earlier, statistical fluctuations can be smoothed by averaging in time from readings at fewer points if the source can be made to exhibit a time history of its own. This can be accomplished by rotation of the ground glass. If possible, it is desirable (for reasons which follow) to eliminate the ground glass rotation from communication systems in certain applications.

There are a number of modifications which may be made to the above embodiment without departing from the spirit and scope of the present invention.

For example, although the above embodiment illustrates modulating the whole transmitting aperture with just one isometric bar grating, hence transmitting only one bit, it is obvious that multiple bits can be sent by a number of schemes either by segmenting the aperture and assigning individual portions to specific spatial frequencies at particular orientations or by overlaying various spatial signals at different angular orientations.

It should be noted that because the detection is made in the receiver plane without any image-forming lenses, the random phase modulation induced by the interlying medium (turbulent atmosphere) has far effect in degrading the inferred image information.

It should be further noted that because the process depends upon detection of speckle statistics at many different points within the beam in order to make a meaningful estimate, the total energy being transmitted has no bearing on the message bit (or bits) being sent. Hence, aerosol scattering along the path (which removes energy at wide angles to the axis of the system), does not provide an off-axis observer with information useful in inferring the information being sent, even if the observer were to know the method of coding completely.

Figure 4:
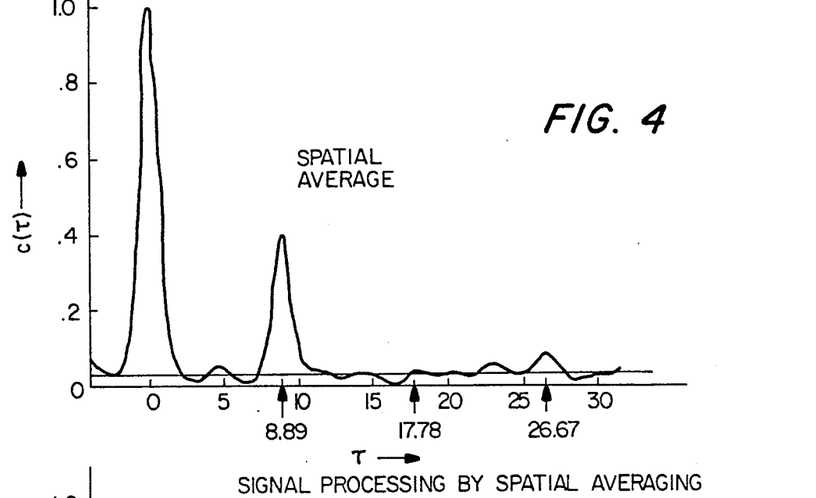
FIG. 4 is a graph illustrating an experimental result utilizing only one photomultiplier detector in the system of FIG. 1.

In order to clarify these points and to demonstrate some of the basic operating conditions of the present invention the following series of tests undertaken prior to the construction of the communication device itself will be described hereinafter. In an early test, the configuration illustrated in FIG. 1 was utilized with the following changes. As usual, an isometric bar grating was placed at the transmitter in close proximity to the ground glass and held static. However, in the detection plane only one photomultiplier was used. The output of this device was sent to a signal processor to be autocorrelated. The multisided mirror served to scan a line through the time-invariant far field speckle pattern. The output of the autocorrelator, shown in FIG. 4, gives the autocorrelation function for this one scan as a function of $\tau$, the effective spatial lag in the detector plane. Since this function is an estimate of the spatial radiance power spectrum of the object (bar grating), the value at $\tau$ equal to zero relates to the average power of the bar grating (of no particular importance to us here), but the harmonic shown at a lag of 8.89mm gives a measure of the power present in the detection plane due to the 133 lines/inch fundamental harmonic at the transmitter. If the bar grating were replaced with one of another spacing, this harmonic would have appeared at another lag, indicating power at some other frequency. Thus, autocorrelation measurements in the detection plane, which depend on spatial lags of a particular magnitude and orientation, results in an estimate of the spatial harmonic composition of a given object radiance distribution.

Figure 5:
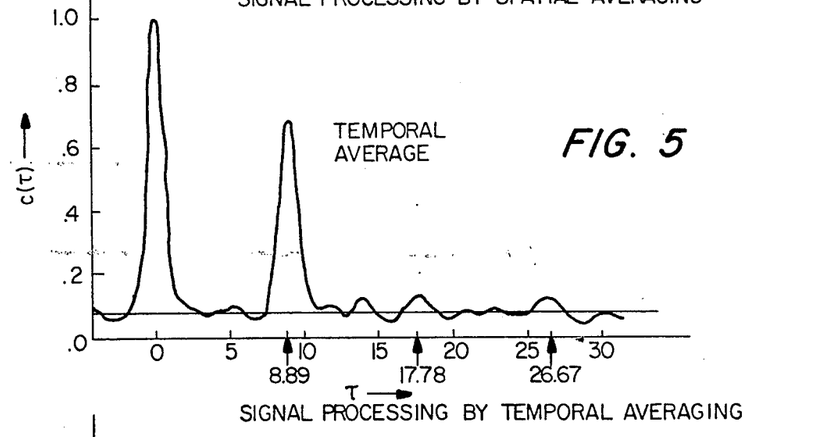
FIG. 5 is a graph illustrating an experimental result utilizing two detectors and rotating ground glass for a comparison with the results illustrated in FIG. 4.
Figure 6:
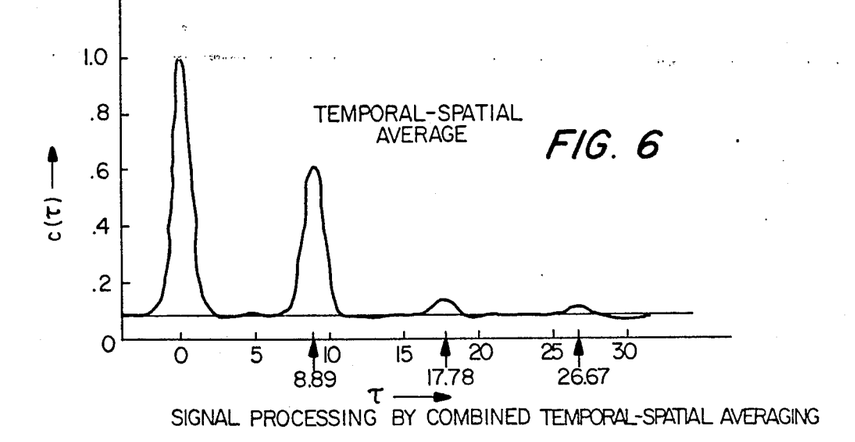
FIG. 6 is a graph illustrating an experimental result with the system of FIG. 1 wherein the ground glass is rotated and linear spatial scanning is effected across the detector apertures.

The goodness of the estimate is related directly to the number of independent statistical measures extracted at the detection plane. If instead of making one linear scan through the speckle pattern, two detectors are set at a given spacing and the statistical variations are introduced by spinning the ground glass as the transmitter as described hereinabove, a more complete statistical description is found for this experimental configuration as can be seen by the results shown in FIG. 5. Here, two photomultipliers are used in the detector plane while the ground glass is spun, and the cross correlation function is examined as a function of detector separation. A more reliable estimate of the object spatial spectrum is derived at values of the higher harmonics (marked at spatial lags of 17.78 and 26.67 mm). However, if both methods of statistical evolution (time change through ground glass movement and linear spatial scanning by mirror rotation) are utilized, an even larger statistical sample is brought to the electronic processor resulting in the combined temporal-spatial average shown in FIG. 6.

Accordingly, the operation of the communication device discussed hereinbefore can now be more readily understood. Since two bar gratings of different frequency can be uniquely identified by their fundamental spatial periods, comparison of power measurements in the detector plane at the two appropriate lags can be used to infer the presence of a particular grating.

Figure 7A:
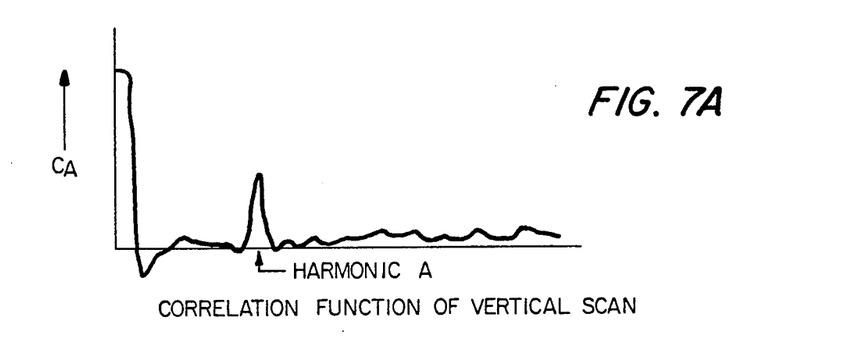
FIGS. 7A to 7C are graphs illustrating the correlation functions of three superimposed bar gratings in the system of FIG. 1 to obtain multiple bit encoding.
Figure 7B:
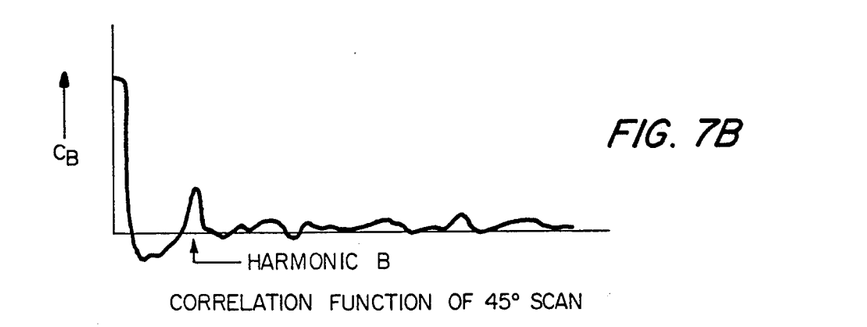
Figure 7C:
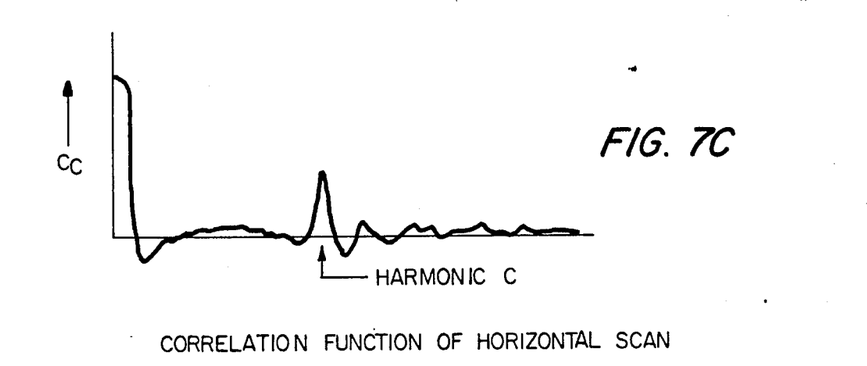

Since the direction as well as the magnitude of the correlation lag is important, it is obvious that a number of objects can be used simultaneously rather than just one at a time. To demonstrate simultaneous bit transmission, three different bar gratings were overlaid on each other, two at 90° orientation, the third at forty five degrees. The same speckle pattern at the detection plane was then scanned and processed at the three appropriate orientations by the spatial average method demonstrated hereinbefore in FIG. 4. The results of this trial are shown in FIG. 7. In each autocorrelation function, the position of the first harmonic together with knowledge of the scan direction uniquely defines the corresponding bar grating and orientation in the object plane.

Figure 8A:
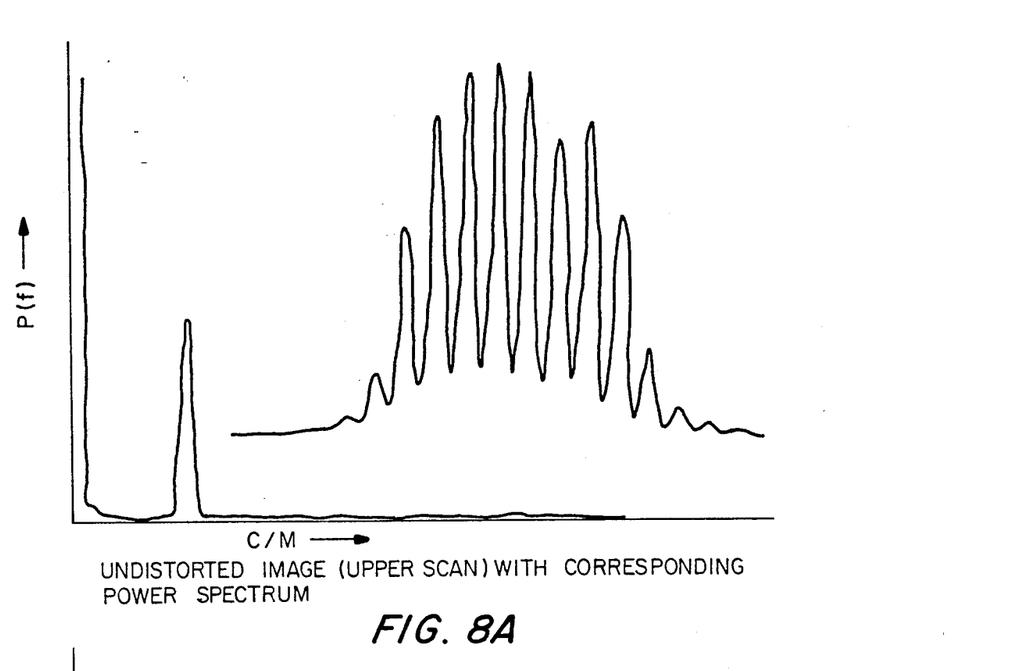
FIGS. 8A and 8B illustrate the results of spatial information transmission by standard image-formation methods both with and without random phase screen modulation of the coded message.
Figure 8B:
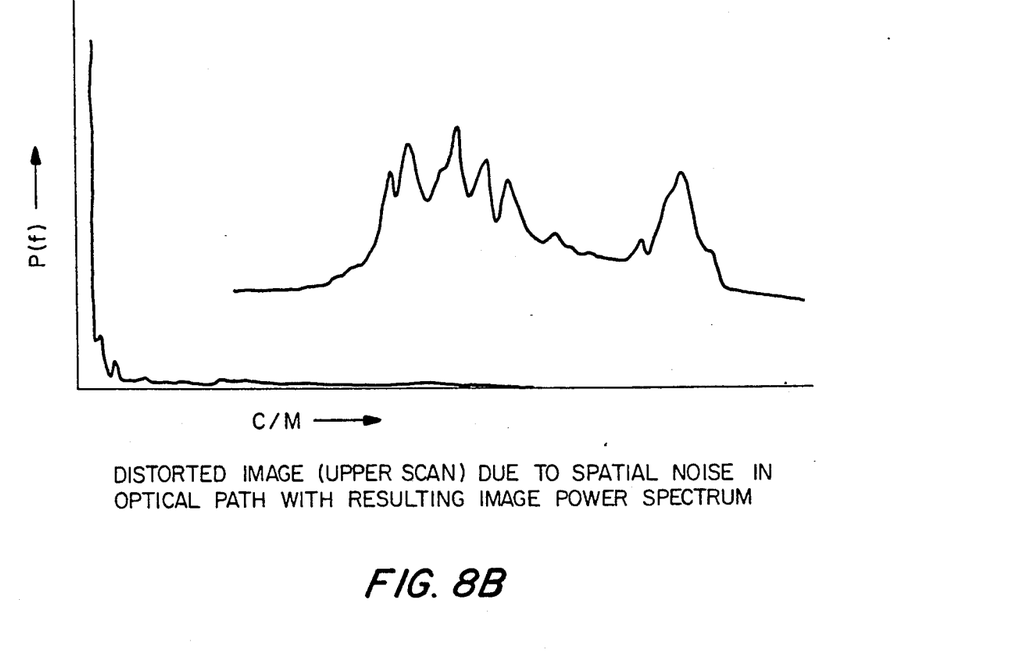

To illustrate another principle of the present invention, that this method of spatial information transmission is relatively insensitive to random phase modulation along the transmission path, we performed the following test for comparison purposes. Referring to FIG. 1, a bar grating was placed in the object plane and the ground glass held static. Immediately before the detection plane, an image-forming lens was placed so that an extremely small portion of the grating image illuminated a pin-hole aperture of a photomultiplier. When the four-sided mirror was rotated, the image could be scanned. This function is shown in FIG. 8A, above the graphed function. Next the power spectrum of this image scan was computed and is shown directly below. It should be noted that this is the identical harmonic content that is inferred by the method of speckle pattern processing. The presence of the first harmonic is clearly seen in this function. Next, a section of glass exhibiting weak random phase distortion was inserted in the optical transmission link. The effect of this glass was to distort the image. This degraded image was then scanned and the corresponding spatial power spectrum computed. These results are shown in FIG. 8B. The image is seriously degraded, so much so, that the power spectrum no longer defines the harmonic content of the object spectrum.

Figure 9:
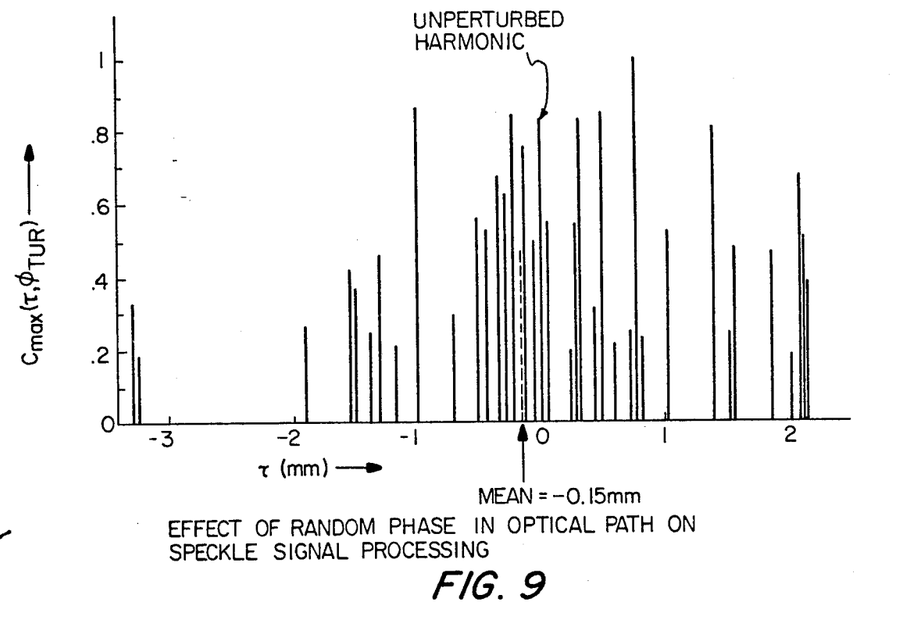
FIG. 9 is a graph illustrating the general effect of a random phase screen in the system of the present invention.

To test the sensitivity of the speckle method to this kind of distortion, the spatial average method (illustrated in FIG. 4) was utilized in the following way. As shown in FIG. 4, without the distorting phase screen, the detector lag is 8.89 mm to measure the power associated with the first harmonic. The strength of this unperturbed harmonic was plotted in FIG. 9 at the abscissa position 0, and is labelled as such. Then, the random phase screen was inserted in the transmission path. The magnitude of the correlation function in general decreased. The amount of the lag (effective detector separation) was then adjusted so as to maximize the magnitude of the correlation reading. An increase in the separation resulted in a new magnitude plotted for positive $\tau$, a decrease in negative $\tau$. Some forty readings were taken for each of forty particular positions of the phase screen. It can be seen that the effect of the random phase screen on any one reading was to increase or decrease the apparent frequency of the harmonic content of the ruling. However, when the separate readings were averaged, the mean measurement converged very closely to the true, undistorted value. Thus, by the speckle method, of the present invention, not only was the harmonic information not lost in a noisy transmission, its apparent value was shifted only slightly in frequency.

Figure 10:
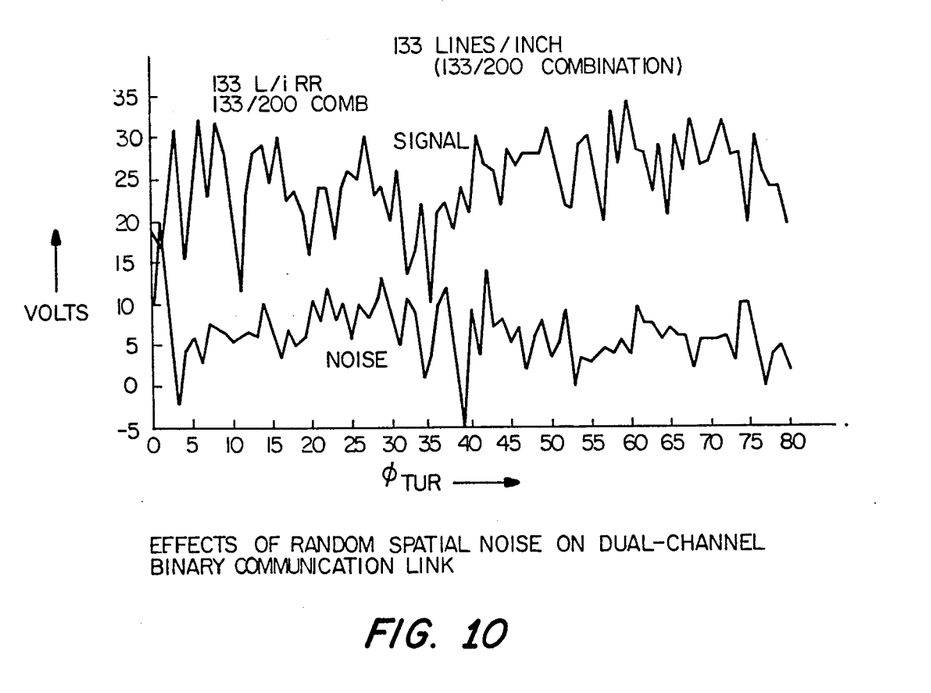
FIG. 10 shows further data illustrating the effects of turbulence on the operation of the binary communication link.

FIG. 10 shows further data describing the effects of turbulence on the operation of a binary communication link as described initially. Here an isometric bar grating has been placed in the transmitter aperture. In the detection plane, harmonic information was estimated at two spatial lags appropriate for bar gratings of 133 and 200 lines/inch. Both powder readings were made for 80 individual positions of the random phase screen. As can be seen in FIG. 10, in all cases but one, greater power is measured in the channel carrying the spatial content of the 133 lines/inch grating (labelled signal in FIG. 10) than in the channel measuring signal content at 200 lines/inch and, hence, simply labelled background noise.

It is the purpose of the present invention to describe a particular method of signal modulation, transmission, and decoding that may be generally referred to as spatial-multiplex, spatial-diversity optical communication.

There are, of course, many other techniques that may be used to transmit optical data of a spatial nature including direct projection of transparencies by optical systems or by using image-forming optics at a reception plane. In our method, no image-forming lens is used. Coherent light is used to illuminate a transparency upon which a bit (or bits) are coded according to amplitude modulation within a transmitting aperture. The bit is characterized by some spatial frequency and orientation. In close proximity to the message bit (or bits) the optical beam must be randomized by transmission through a phase screen of fast phase variation (such as ground glass). At the path terminus of the communication link, the resulting optical speckle pattern must be detected at many points, with this data being properly cross multiplied and averaged; that is to say a two-dimensional correlation function of the received intensity must be computed and examined at spatial lags appropriate for the chosen transmission format. The rate at which information may be transmitted depends upon many complicated tradeoffs including the number of bits being coded simultaneously, the size, number and speed of the detectors, and the spatial noise along the link itself.

We wish it to be understood that we do not desire to be limited to the exact details of construction shown and described, for obvious modifications can be made by a person skilled in the art.

It is claimed

1. An optical communication system for transmitting coded message bits comprising:
    a source of coherent radiation for transmitting a beam of light along an optical path;
    means for spatially phase modulating said beam of light;
    coding means in said optical path for modulating said beam of light to generate a selected spatial amplitude pattern through a cross section of said beam, the code corresponding to said selected spatial amplitude pattern and forming a message bit therein;
    means for detecting the amplitude of said pattern in at least two positions separated by a predetermined distance through the cross section of said beam to determine the presence or absence of said message bit.

2. The optical communication system according to claim 1 wherein said means for spatially phase modulating said beam of light comprises a section of ground glass disposed within a beam defining aperture, said ground glass being rotated in the plane of said aperture.

3. The optical communication system according to claim 1 wherein said coding means comprises an isometric bar grating having a predetermined number of lines per inch and at a predetermined angular orientation within the beam path.

4. The optical communication system according to claim 3 wherein said coding means comprises a plurality of said isometric bar gratings disposed in tandem in said beam path.

5. The optical communication system of claim 3 wherein said bar grating is disposed closely adjacent to said means for spatially modulating said beam of light.

6. The optical communication system according to claim 1 wherein there is further provided rotatable mirror means for performing a line scan through the cross section of said light beam and for directing the scanned light to said detecting means.

7. The optical communication system of claim 1 wherein said detecting means comprises at least two point detectors spaced by a predetermined distance, said distance corresponding to the far field spatial lag for the fundamental spatial frequency of the bar grating containing the code being transmitted.

8. The optical communication system of claim 7 wherein means are provided to compute a time averaged correlation of the outputs of said at least two point detectors.

9. The optical system of claim 8 wherein said means for computing comprises integrator means for integrating the product of the output of said two point detectors over a predetermined time interval.

10. The optical system according to claim 1 wherein said source of coherent radiation is a laser.

* * * * *